United States Patent
Ishii et al.

(10) Patent No.: US 9,886,802 B2
(45) Date of Patent: Feb. 6, 2018

(54) VEHICLE POWER SUPPLY DEVICE AND MALFUNCTION DIAGNOSIS METHOD THEREOF

(71) Applicant: Fuji Jukogyo Kabushiki Kaisha, Tokyo (JP)

(72) Inventors: Kentaro Ishii, Tokyo (JP); Yo Masuda, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/260,022

(22) Filed: Sep. 8, 2016

(65) Prior Publication Data

US 2017/0092023 A1    Mar. 30, 2017

(30) Foreign Application Priority Data

Sep. 29, 2015 (JP) ................................ 2015-190961

(51) Int. Cl.
G07C 5/08  (2006.01)
B60L 11/18  (2006.01)

(52) U.S. Cl.
CPC ........ *G07C 5/0816* (2013.01); *B60L 11/1811* (2013.01)

(58) Field of Classification Search
CPC ........................... B60L 11/1811; G07C 5/0816
USPC ....................................................... 701/34.4
See application file for complete search history.

(56) References Cited

FOREIGN PATENT DOCUMENTS

| JP | 2008-289307 A | 11/2008 |
| JP | 2012-085432 A | 4/2012 |
| JP | 2012-253993 A | 12/2012 |
| JP | 2013-090542 A | 5/2013 |
| JP | 2013-240191 A | 11/2013 |
| JP | 2014-007861 A | 1/2014 |

OTHER PUBLICATIONS

JPO Decision to Grant dated Feb. 21, 2017.

*Primary Examiner* — Mussa A Shaawat
*Assistant Examiner* — Nadeem Odeh
(74) *Attorney, Agent, or Firm* — McGinn IP Law Group, PLLC (57) ABSTRACT

A vehicle power supply device including a power storage device includes: an inlet that is coupled to an external power supply via a charging cable when the power storage device is charged using the external power supply; an outlet that is coupled to an external device when power is supplied from the power storage device to the external device; a first power converter that is formed between the inlet and the power storage device and converts alternating current (AC) power into direct current (DC) power; a second power converter that is formed between the outlet and the power storage device and converts DC power into AC power; and a malfunction diagnosis unit that diagnoses malfunction of a power supply path in a state in which the inlet and the outlet are coupled to each other using the charging cable.

18 Claims, 6 Drawing Sheets

VEHICLE POWER SUPPLY DEVICE AND MALFUNCTION DIAGNOSIS METHOD THEREOF

CROSS-REFERENCE TO RELATED APPLICATIONS

The present application claims priority from Japanese Patent Application No. 2015-190961 filed on Sep. 29, 2015, the entire contents of which are hereby incorporated by reference.

BACKGROUND

1. Technical Field

The present invention relates to a vehicle power supply device including a power storage device and a malfunction diagnosis method thereof.

2. Related Art

An electric vehicle which can be charged with an external power supply includes a hybrid electric vehicle (so-called plug-in hybrid) having an electric motor and an engine as power sources as well as an electric vehicle having only an electric motor as a power source. An in-vehicle charger is mounted on the electric vehicles to convert AC power into DC power, and power is supplied from an external power supply to a power storage device via the in-vehicle charger at the time of charging (see Japanese Unexamined Patent Application Publication (JP-A) Nos. 2008-289307 and 2012-85432).

During malfunction of the external power supply, however, power cannot be normally supplied to the in-vehicle charger and thus the electric vehicle generally detects charging abnormality and stops external charging. In addition, during disconnection of a power supply path connected to the in-vehicle charger, power cannot also be normally supplied to the in-vehicle charger and thus the electric vehicle also detects charging abnormality and stops external charging.

When the charging abnormality is detected by the electric vehicle as described above, a cause of the charging abnormality needs to be specified to appropriately cope with the charging abnormality. However during malfunction of an external power supply such as a household receptacle, it is difficult for the electric vehicle to grasp the malfunction state. Even during malfunction of the power supply path of the in-vehicle charger, it is difficult for the electric vehicle to grasp the malfunction state of the power supply path through which power is supplied only at the time of external charging.

SUMMARY OF THE INVENTION

It is desirable to facilitate an operation of specifying a cause of abnormality.

An aspect of the present invention is to provide a vehicle power supply device including a power storage device. The vehicle power supply device includes: an inlet that is coupled to an external power supply via a charging cable when the power storage device is charged using the external power supply; an outlet that is coupled to an external device when power is supplied from the power storage device to the external device; a first power converter that is disposed between the inlet and the power storage device and converts alternating current (AC) power into direct current (DC) power; a second power converter that is disposed between the outlet and the power storage device and converts DC power into AC power; and a malfunction diagnosis unit that diagnoses malfunction of a power supply path in a state in which the inlet and the outlet are coupled to each other using the charging cable.

Another aspect of the present invention is directed to a malfunction diagnosis method of a vehicle power supply device including a power storage device. The vehicle power supply device includes: an inlet that is coupled to an external power supply via a charging cable when the power storage device is charged using the external power supply; an outlet that is coupled to an external device when power is supplied from the power storage device to the external device; a first power converter that is disposed between the inlet and the power storage device and converts alternating current (AC) power into direct current (DC) power; and a second power converter that is disposed between the outlet and the power storage device and converts DC power into AC power. The malfunction diagnosis method includes diagnosing a malfunction of a power supply path in a state in which the inlet and the outlet are coupled to each other using the charging cable.

DETAILED DESCRIPTION

Figure 1:
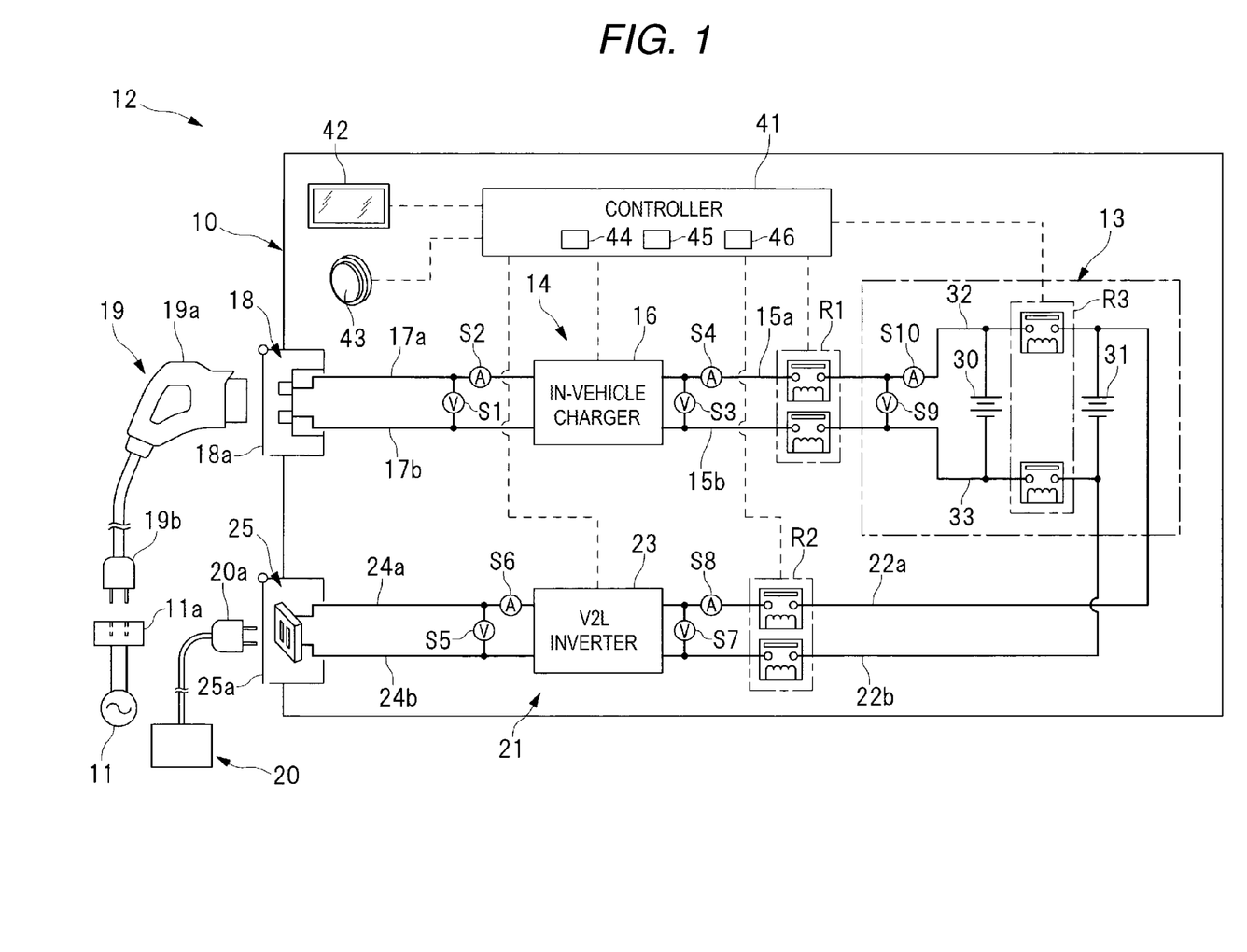
FIG. 1 is a schematic diagram illustrating a vehicle power supply device according to an example of the present invention.

Hereinafter, an example of the present invention will be described with reference to the accompanying drawings in detail. FIG. 1 is a schematic diagram illustrating a vehicle power supply device 10 according to an example of the present invention. A malfunction diagnosis method of the vehicle power supply device according to the example of the present invention is carried out by the vehicle power supply device 10 illustrated in FIG. 1. The vehicle power supply device 10 illustrated in FIG. 1 is a vehicle power supply device which is mounted on an electric vehicle 12 which can be charged with an external power supply 11. Examples of the electric vehicle 12 to which the vehicle power supply device 10 is applied include an electric vehicle including only an electric motor as a power source and a hybrid electric vehicle (so-called plug-in hybrid vehicle) including an electric motor and an engine as power sources.

As illustrated in FIG. 1, the vehicle power supply device 10 includes a high-voltage battery (power storage device) 13 that supplies power to a drive motor or the like which is not illustrated. An external charging system 14 is coupled to the high-voltage battery 13, and introduces power from the external power supply 11. The external charging system 14 includes an in-vehicle charger 16 that is coupled to the high-voltage battery 13 via power supply lines 15a and 15b and an inlet 18 that is coupled to the in-vehicle charger 16 via power supply lines (first power supply path) 17a and 17b. When the high-voltage battery 13 is charged using the external power supply 11, a connector 19a of a charging cable 19 is coupled to the inlet 18 of the electric vehicle 12 and a plug 19b of the charging cable 19 is coupled to a receptacle 11a of the external power supply 11. AC power that is output from the external power supply 11 is supplied to the high-voltage battery 13 via the in-vehicle charger 16 that is a first power converter. The in-vehicle charger 16 is a so-called AC/DC converter including plural switching elements and the like and has a function of converting AC power into DC power. An inlet cover 18a is formed in the inlet 18 in an openable and closable manner.

A power supply system 21 is coupled to the high-voltage battery 13, and supplies power to an external electrical device (external device) 20. The power supply system 21 includes a V2L inverter 23 that is coupled to the high-voltage battery 13 via power supply lines 22a and 22b and an outlet 25 that is coupled to the V2L inverter 23 via power supply lines (second power supply path) 24a and 24b. When power is supplied from the high-voltage battery 13 to the electrical device 20, a plug 20a of the electrical device 20 is coupled to the outlet 25 of the electric vehicle 12. DC power output from the high-voltage battery 13 is supplied to the electrical device 20 via the V2L inverter 23 that is a second power converter. The V2L inverter 23 includes plural switching elements and the like and has a function of converting DC power into AC power. An outlet cover 25a is formed in the outlet 25 in an openable and closable manner.

In this way, the power supply system 21 which is incorporated in the electric vehicle 12 is called a V2L system or a V2H system. The V2L is an abbreviation of "Vehicle to Load" and means that power is supplied from the electric vehicle 12 to the external electrical device 20. The V2H is an abbreviation of "Vehicle to Home" and means that power is supplied from the electric vehicle 12 to an electrical device in home.

In order to grasp an operating state of the external charging system 14 or the power supply system 21, various sensors S1 to S8 are provided in the power supply lines 15a, 15b, 17a, 17b, 22a, 22b, 24a, and 24b. The voltage sensor S1 and the current sensor S2 are provided in the power supply lines 17a and 17b that couple the inlet 18 and the in-vehicle charger 16 to each other. The voltage sensor S3 and the current sensor S4 are provided in the power supply lines 15a and 15b that couple the in-vehicle charger 16 and the high-voltage battery 13 to each other. A relay R1 is provided in the power supply lines 15a and 15b, and is switchable between a connected state and a disconnected state. The voltage sensor S5 and the current sensor S6 are provided in the power supply lines 24a and 24b that couple the outlet 25 and the V2L inverter 23 to each other. The voltage sensor 27 and the current sensor S8 are provided in the power supply lines 22a and 22b that couple the V2L inverter 23 and the high-voltage battery 13 to each other. A relay R2 is provided in the power supply lines 22a and 22b, and is switchable between a connected state and a disconnected state.

The high-voltage battery 13 includes plural battery packs (storage capacitors) 30 and 31 that are coupled to each other in parallel. A positive electrode line 32 is coupled to a positive electrode terminal of each of the battery packs 30 and 31, and a negative electrode line 33 is coupled to a negative electrode terminal of each of the battery packs 30 and 31. A relay (switch) R3 is provided in the positive electrode line 32 and the negative electrode line 33, and is switchable between a connected state and a disconnected state. The battery packs 30 and 31 are electrically coupled to each other when the relay R3 is switched to the connected state, and the battery packs 30 and 31 are electrically separated from each other when the relay R3 is switched to the disconnected state. That is, when the relay R3 is switched to the disconnected state, the battery pack 30 coupled to the external charging system 14 and the battery pack 31 coupled to the power supply system 21 are electrically separated from each other. The high-voltage battery 13 is incorporated with a voltage sensor S9 that detects a battery voltage and a current sensor S10 that detects a battery current.

The vehicle power supply device 10 includes a controller 41 that controls operating states of the external charging system 14 and the power supply system 21. The controller 41 outputs control signals to the in-vehicle charger 16, the V2L inverter 23, and the relays R1 to R3 and controls the operating states of the external charging system 14 and the power supply system 21. Various sensors S1 to S10 of the external charging system 14 and the power supply system 21 are coupled to the controller 41. A display 42 is coupled to the controller 41, and notifies an occupant or an operator of information. In addition, a start switch 43 is coupled to the controller 41, and is operated by a driver when a traveling system is started or stopped. The controller 41 is constituted by, for example, a microcomputer including a CPU, a ROM, and a RAM, and the like and a drive circuit unit and the like that generates control currents of various actuators.

When the high-voltage battery 13 is charged using the external power supply 11, the controller 41 detects charging abnormality relevant to external charging and performs malfunction diagnosis control of specifying a cause of charging abnormality. In order to perform the malfunction diagnosis control, the controller 41 is provided with various functional units such as a charging abnormality detection unit 44, an operation instructing unit 45, and a malfunction diagnosis unit 46. As described later, the charging abnormality detection unit 44 detects occurrence of charging abnormality in the external charging on the basis of an input state of AC power to the in-vehicle charger 16. The operation instructing unit 45 instructs an operator to perform an operation of coupling the charging cable 19 after the charging abnormality is detected in the external charging. The malfunction diagnosis unit 46 diagnoses malfunction such as disconnection in power supply paths such as the power supply lanes 17a and 17b in accordance with a predetermined procedure after being instructed to perform the operation of coupling the charging cable 19.

[Malfunction Diagnosis Control]

Figure 2:
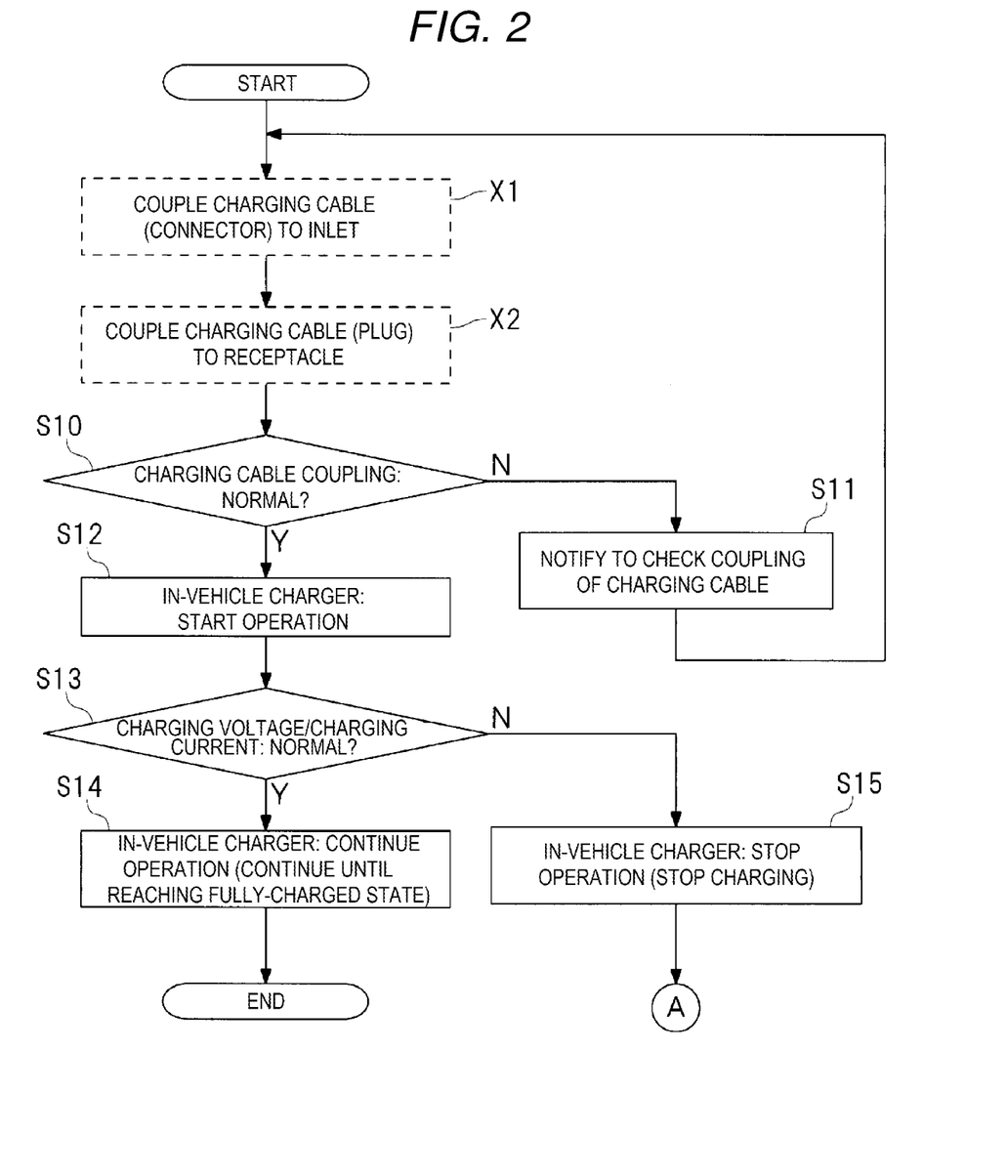
FIG. 2 is a flowchart illustrating an instance of an execution procedure of malfunction diagnosis control.
Figure 3:
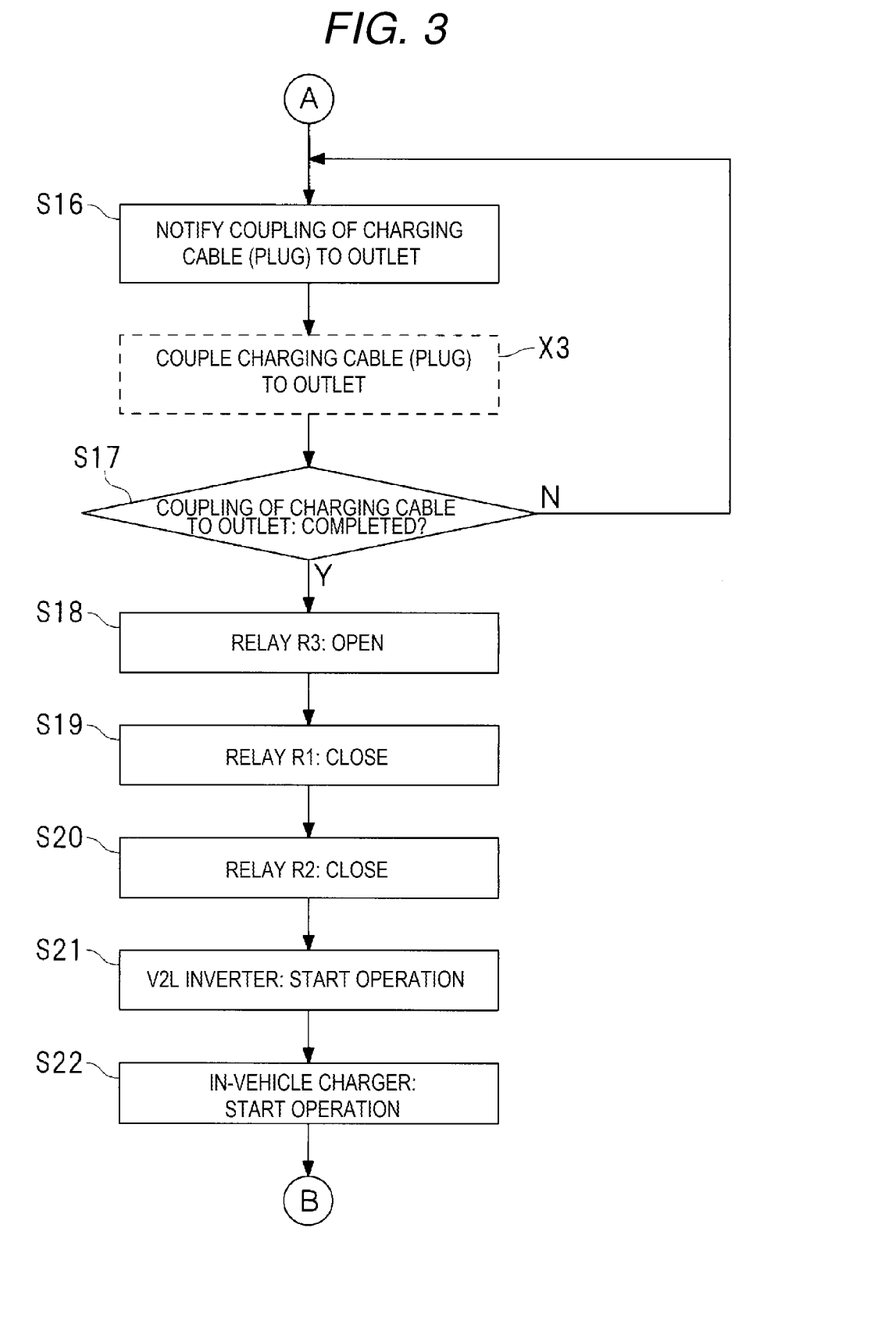
FIG. 3 is a flowchart illustrating an instance of an execution procedure of malfunction diagnosis control.
Figure 4:
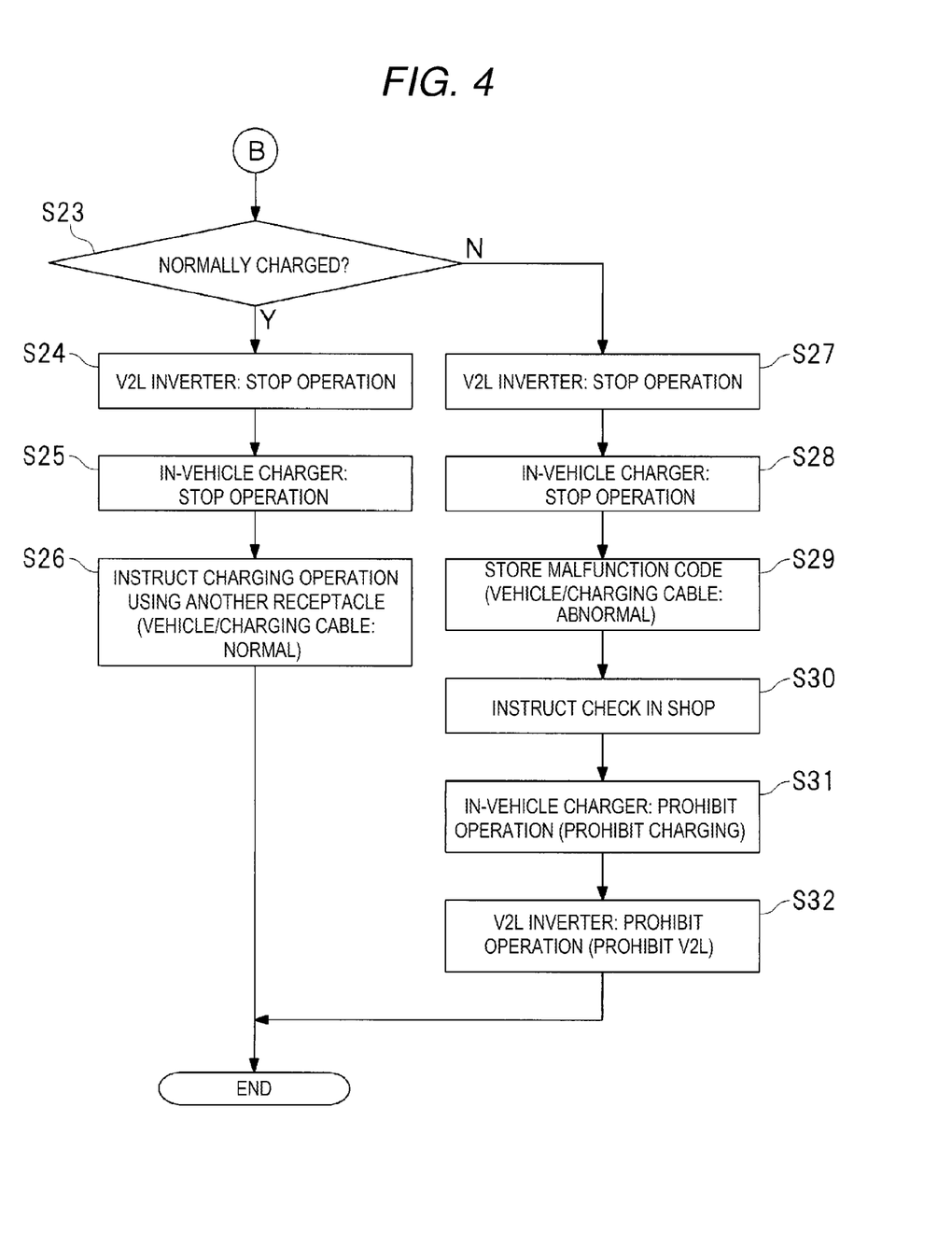
FIG. 4 is a flowchart illustrating an instance of an execution procedure of malfunction diagnosis control.

Malfunction diagnosis control which is performed by the controller 41 will be described below. FIGS. 2 to 4 are flowcharts illustrating an instance of an execution procedure of the malfunction diagnosis control. The flowcharts illustrated in FIGS. 2 to 4 are coupled to each other at parts indicated by reference signs A and B. As illustrated in FIGS. 2 and 3, steps X1 to X3 surrounded by dotted lines are steps which are performed by an operator. In FIGS. 2 to 4, the Connected state of the relays R1 to R3 is described as "CLOSE" and the disconnected state of the relays R1 to R3 is described as "OPEN". In the following description, the connected state of the relays R1 to R3 will be described to be "closed" and the disconnected state of the relays R1 to R3 will be described to be "open".

In an initial state of the electric vehicle 12 at the time of starting the malfunction diagnosis control, the start switch 43 is in a state of being turned off, the state of charge (SOC) of the high-voltage battery 13 is in a state other than a fully-charged state, and the charging cable 19 is in a state of not being coupled to the inlet 18. In the initial state of the electric vehicle 12 at the time of starting the malfunction diagnosis control, the relays R1 and R2 are in a state of being open, the relay R3 is in a state of being closed, the in-vehicle charger 16 is in a state of being stopped, and the V2L inverter 23 is in a state of being stopped.

In order to externally charge the electric vehicle 12, as illustrated in FIG. 2, the connector 19*a* of the charging cable 19 is coupled to the inlet 18 of the electric vehicle 12 by an operator in step X1. In the following step X2. The plug 19*b* of the charging cable 19 is coupled to the receptacle 11*a* of the external power supply 11 by the operator. In this way, when the external power supply 11 and the electric vehicle 12 are coupled to each other via the charging cable 19, the procedure proceeds to step S10 and the controller 41 determines whether the charging cable 19 is normally coupled. In step S10, a coupling state of the connector 19*a* to the inlet 18 can be determined, for example, using a switch that detects the contact state. When it is determined in step S10 that the charging cable 19 is not normally coupled, the procedure proceeds to step S11 and a message is displayed on the display 42 to urge the operator to check the coupling of the charging cable 19. On the other hand, when it is determined in step S10 that the charging cable 19 is normally coupled, the procedure proceeds to step S12 and the external charging is started by the operation start of the in-vehicle charger 16.

Subsequently, in step S13 (charging abnormality detecting step) it is determined whether a charging voltage and a charging current input to the in-vehicle charger 16 are normal. That is, in step S13, it is determined whether the charging voltage detected by the voltage sensor S1 is within a predetermined range and the charging current detected by the current sensor S2 is within a predetermined range. Thus, in step S13, it is determined on the basis of the input state of AC power to the in-vehicle charger 16 whether charging abnormality occurs in the external charging. When it is determined in step S13 that the charging voltage and the charging current are within the predetermined ranges and the charging abnormality does not occur, the procedure proceeds to step S14 and the in-vehicle charger 16 is continuously in the operating state until reaching a predetermined state of charge (SOC). On the other hand, when it is determined in step S13 that at least one of the charging voltage and the charging current is out of the predetermined range and the charging abnormality occurs, the procedure proceeds to step S15 and the in-vehicle charger 16 is stopped to stop the external charging.

In this way, when the charging abnormality is detected in the external charging, the procedure proceeds to step S16 (operation instructing step) and a message is displayed on the display 42 to instruct the operator to perform an operation of coupling the inlet 18 and the outlet 25 using the charging cable 19 as illustrated in FIG. 3. In the following step X3, the operator having received the message decouples the plug 19*b* of the charging cable 19 from the receptacle 11*a* of the external power supply 11 and couples the plug 19*b* of the charging cable 19 to the outlet 25 of the electric vehicle 12.

Figure 5A:
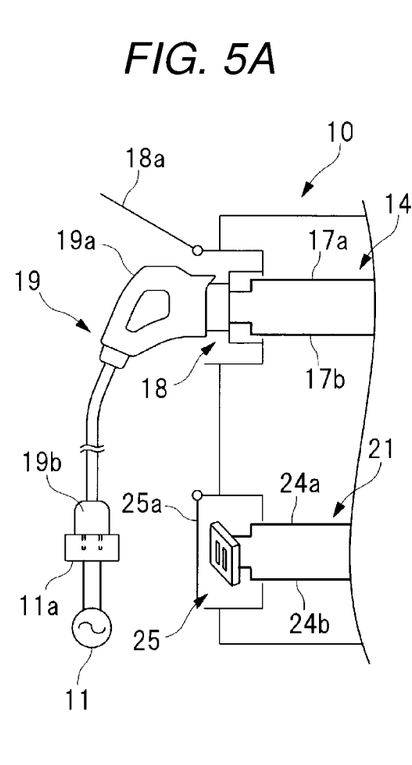
FIGS. 5A to 5C are diagrams illustrating a coupled state of a charging cable after charging abnormality is detected.
Figure 5B:
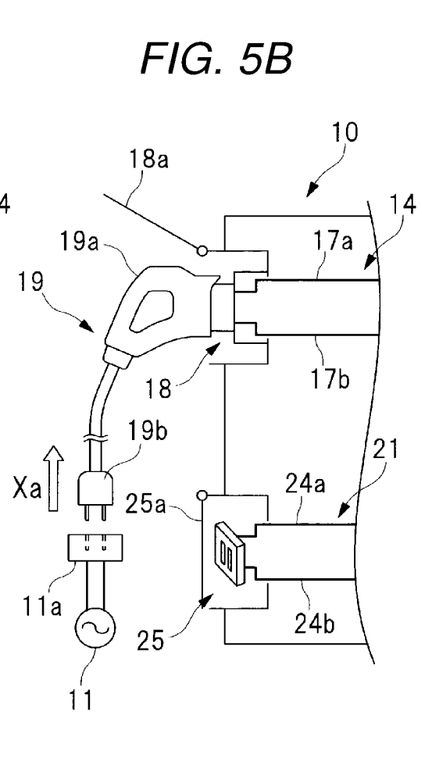
Figure 5C:
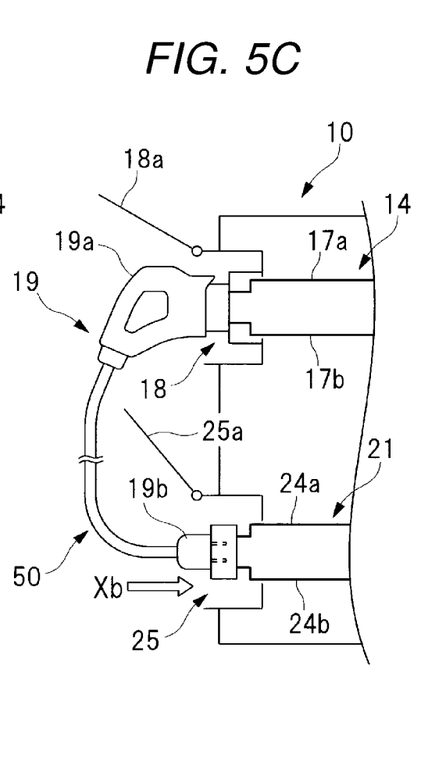

FIGS. 5A to 5C are diagrams illustrating the coupling state of the charging cable 19 after the charging abnormality is detected. As illustrated in FIG. 5A, in the external charging, the connector 19*a* of the charging cable 19 is coupled to the inlet 18 of the electric vehicle 12, and the plug 19*b* of the charging cable 19 is coupled to the receptacle 11*a* of the external power supply 11. Then, when a message is displayed on the display 42 to instruct the operator to perform the coupling operation of the charging cable 19, the operator having received the message decouples the plug 19*b* of the charging cable 19 from the receptacle 11*a* of the external power supply 11 as indicated by an arrow Xa in FIG. 5B. As indicated by an arrow Xb in FIG. 5C, the operator having received the message couples the plug 19*b* of the charging cable 19 to the outlet 25 of the electric vehicle 12. In this way, since the message is displayed on the display 42 to instruct the coupling operation after the charging abnormality is detected, the operator receiving the message and operating the charging cable 19 electrically couples the external charging system 14 and the power supply system 21 to each other.

In this way, when the message for instructing the coupling operation is displayed on the display 42 to urge the operator to perform the coupling operation of the charging cable 19, the procedure proceeds to step S17 and it is determined whether the plug 19*b* of the charging cable 19 is coupled to the outlet 25. In step S17, for instance, the V2L inverter 23 is switched to the operating state and the stop state and it can be determined whether the charging cable 19 is coupled to the outlet 25 on the basis of a variation in voltage which is detected by the voltage sensor S1 at this time. That is, when the output voltage of the V2L inverter 23 and the detected voltage of the voltage sensor S1 are equal to each other, it is determined that the external charging system 14 and the power supply system 21 are electrically coupled to each other, that is that the charging cable 19 is coupled to the outlet 25. In step S17, it is possible to determine the coupling state of the plug 19*b* to the outlet 25 using the switch that detects a contact state.

When it is determined in step S17 that the charging cable 19 is not coupled to the outlet 25, the procedure returns to step S16 and the message is again displayed on the display 42 to instruct the coupling operation. On the other hand, when it is determined in step S17 that the charging cable 19 is coupled to the outlet 25, the procedure proceeds to step S18 and steps subsequent to step S18 and a process (hereinafter, referred to as a cause specifying process) of specifying an occurrence cause of the charging abnormality is performed. Steps S18 to S23 to be described later constitute the diagnosing of malfunction of the malfunction diagnosis method of the vehicle power supply device according to the example of the present invention. In order to perform the above-mentioned cause specifying process, the relay R3 is opened, in step S18, the relay R1 is closed in step S19, and the relay R2 is closed in step S20. The V2L inverter 23 is driven in step S21, and the in-vehicle charger 16 is driven in step S22.

Figure 6:
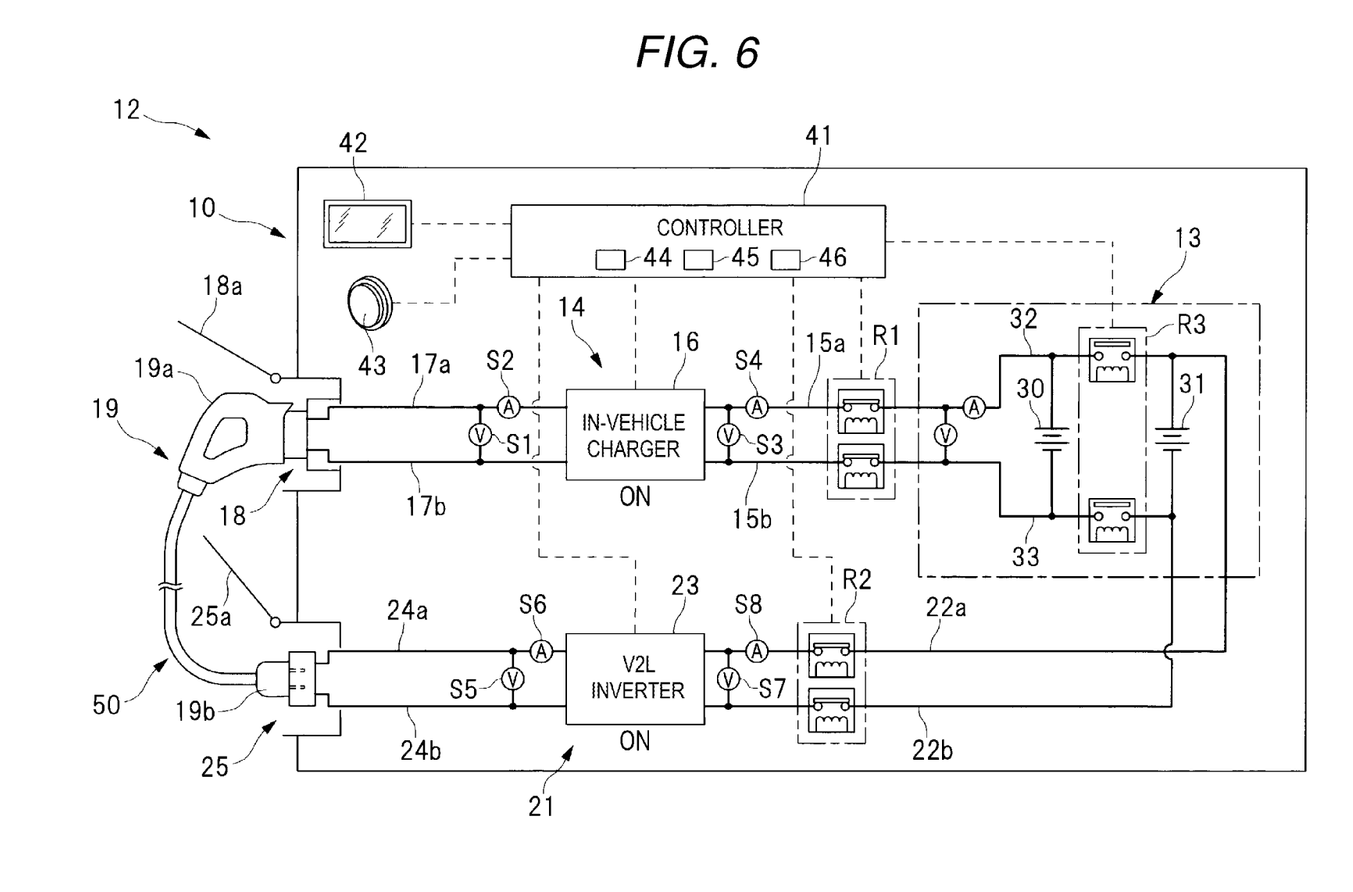
FIG. 6 is a schematic diagram illustrating an operating state of the vehicle power supply device in a cause specifying process.

FIG. 6 is a schematic diagram illustrating an operating state of the vehicle power supply device 10 in the cause specifying process. In the cause specifying process, as illustrated in FIG. 6, the relays R1 and R2 are closed and both the V2L inverter 23 and the in-vehicle charger 16 are driven. In this way, since both the V2L inverter 23 and the in-vehicle charger 16 are driven in a state in which the V2L inverter 23 and the in-vehicle charger 16 are coupled to each other via the charging cable 19, a current can flow from the power supply system 21 to the external charging system 14. That is, the power supplied from the battery pack 31 to the V2L inverter 23 is supplied to the battery pack 30 via the charging cable 19 and the in-vehicle charger 16.

In the state in which the power is supplied from the power supply system 21 to the external charging system 14, as illustrated in FIG. 4, it is determined in step S23 whether the high-voltage battery 13 is normally charged by the in-vehicle charger 16. In step S23, it is determined that the charging is normally performed by the in-vehicle charger 16, for instance, when the output power of the in-vehicle charger 16 is equal to or greater than a predetermined threshold value. On the other hand, it is determined that the charging is abnormally performed by the in-vehicle charger 16 when the output power of the in-vehicle charger 16 is below the threshold value. The output power of the in-vehicle charger 16 can be calculated by multiplying the detected voltage of the voltage sensor 33 by the detected current of the current sensor S4.

When it is determined in step S23 that the charging is normally performed by the in-vehicle charger 16, the V2L inverter 23 is stopped in step S24 and the in-vehicle charger 16 is stopped in step S25. In the state in which the charging is normally performed by the in-vehicle charger 16, the power is normally supplied from the V2L inverter 23 to the in-vehicle charger 16 via the charging cable 19. That is, the external charging system 14 or the power supply system 21 on the vehicle side normally functions, and a power supply path 50 including the power supply lines 17a and 17b, the charging cable 19, and the power supply lines 24a and 24b normally functions. In this case, since it is estimated that a possibility of malfunction exists on the external power supply side other than the vehicle side, the procedure proceeds to step S26 and a message is displayed on the display 42 to instruct the charging operation using another external power supply.

On the other hand, when it is determined in step S23 that the charging is abnormally performed by the in-vehicle charger 16, the V2L inverter 23 is stopped in step S27 and the in-vehicle charger 16 is stopped in step S28. In the state in which the charging is abnormally performed by the in-vehicle charger 16, the power is not normally supplied from the V2L inverter 23 to the in-vehicle charger 16 via the charging cable 19. That is, a possibility of malfunction exists in the external charging system 14, the power supply system 21, or the charging cable 19, that is, a possibility of disconnection or the like in the power supply path 50 including the power supply lines 17a and 17b, the charging cable 19, and the power supply lines 24a and 24b exists. Accordingly, malfunction codes corresponding to the malfunctions of the external charging system 14, the power supply system 21, and the charging cable 19 are stored in step S29 and a message for instructing a check operation in a shop is displayed on the (display 42 in the following step S30. Since a possibility of malfunction exists in the external charging system 14 or the power supply system 21 on the vehicle side, the operation of the in-vehicle charger 16 is prohibited in step S31 and the operation of the V2L inverter 23 is prohibited in step S32.

[Conclusion]

As described above, the malfunction of the power supply path 50 is diagnosed by the controller 41 in the state in which the inlet 18 and the outlet 25 are coupled to each other via the charging cable 19. Accordingly, since the V2L inverter 23 and the in-vehicle charger 16 can be coupled to each other, it is possible to diagnose whether the cause of charging abnormality exists on the vehicle side without using the external power supply 11. In this way, since it can be specified whether the cause of charging abnormality is present on the vehicle side, it is possible to much facilitate the operation of specifying the abnormality cause, that is, trouble shooting operation.

That is, when the charging abnormality is detected, the message is displayed on the display 42 to instruct the coupling operation of the charging cable 19. Accordingly, as illustrated in FIG. 6, the charging cable 19 is coupled to the inlet 18 and the outlet 25, and the V2L inverter 23 and the in-vehicle charger 16 are coupled to each other via the charging cable 19. Subsequently, the V2L inverter 23 can serve as a power supply of the in-vehicle charger 16 by driving of the V2L inverter 23 in the state in which the V2L inverter 23 and the in-vehicle charger 16 are coupled to each other. Accordingly, since the power can be supplied to the external charging system 14 without using the external power supply 11, it is possible to diagnose whether the cause of charging abnormality is present on the vehicle side (the electric vehicle side). In this way, since it can be specified whether the cause of charging abnormality is present on the vehicle side, it is possible to much facilitate the operation of specifying the abnormality cause, that is, a trouble shooting operation.

In the above-mentioned description, both the V2L inverter 23 and the in-vehicle charger 16 are driven in the cause specifying process, but only the V2L inverter 23 may be driven without being limited to this configuration. Even in this case, since the V2L inverter 23 and the in-vehicle charger 16 are coupled to each other via the charging cable 19, the output voltage of the V2L inverter 23 can be applied to the input side of the in-vehicle charger 16. That is, it is possible to diagnose malfunction such as disconnection of the power supply path 50 including the power supply lines 17a and 17b, the charging cable 19, and the power supply lines 24a and 24b by comparing the output voltage of the V2L inverter 23 with the detected voltage of the voltage sensor S1.

As illustrated in FIG. 6, the relay R3 incorporated in the high-voltage battery 13 is opened in the malfunction diagnosis control. In the malfunction diagnosis control, that is, the battery pack 30 coupled to the external charging system 14 and the battery pack 31 coupled to the power supply system 21 are electrically separated from each other. In this way, by the separation of the battery pack 30 which is charged for the malfunction diagnosis from the battery pack 31 which is discharged for the malfunction diagnosis, it is possible to stabilize the voltages of the battery packs 30 and 31 and to improve accuracy of the malfunction diagnosis.

The present invention is not limited to the above-mentioned example, but can be modified in various forms without departing from the gist of the present invention. A battery is employed as the power storage device, but a capacitor may be employed as the power storage device without being limited to this configuration. In the above description, the relay R3 is incorporated in the high-voltage battery 13, but the relay R3 may be removed from the high-voltage battery 13 without being limited to this configuration. When the relay R3 is removed from the high-voltage battery 13, the power circulates between the external charging system 14 and the power supply system 21 at the time of the malfunction diagnosis control. In the above description, the relay R3 having a mechanical contact is employed as the switch, but a semiconductor switch not having a mechanical contact may be employed without being limited to this configuration.

In the above description, the voltage sensors and the current sensors are provided in the power supply lines, but the present invention is not limited thereto. For instance, at least one of the voltage sensor S1 and the current sensor S2 may be removed from the power supply lines 17a and 17b coupled to the input side of the in-vehicle charger 16. At least one of the voltage sensor S3 and the current sensor S4 may be removed from the power supply lines 15a and 15b coupled to the output side of the in-vehicle charger 16. At least one of the voltage sensor S5 and the current sensor S6 may be removed from the power supply lines 24a and 24b coupled to the output side of the V2L inverter 23. At least one of the voltage sensor S7 and the current sensor S8 may be removed from the power supply lines 22a and 22b coupled to the input side of the V2L inverter 23.

In the above description, it is determined whether the output power of the in-vehicle charger 16 is normal in the process of specifying the cause of the charging abnormality, but the present invention is not limited thereto. For instance, it may be determined whether the charging is normally performed by the in-vehicle charger 16 on the basis of the output voltage of the in-vehicle charger 16, or it may be determined whether the charging is normally performed by the in-vehicle charger 16 on the basis of the output current of the in-vehicle charger 16. In the process of specifying the cause of the charging abnormality, the malfunction of the voltage sensors S1 and S5 may be diagnosed by comparison of the detected voltages of the voltage sensors S1 and S5, or the malfunction of the current sensors S2 and S6 may be diagnosed by comparison of the detected currents of the current sensors S2 and S6.

In the above description, the operator is instructed to perform the coupling operation using the display 42, but the present invention is not limited thereto, the operator may be instructed to perform the coupling operation by a voice message from a speaker. In the above description, the charging cable 19 is coupled to the inlet 18 of the electric vehicle 12 when the high-voltage battery 13 is charged using the external power supply 11, but the present invention is not limited thereto. For instance, in the electric vehicle 12 in which the charging cable 19 is fixed to the inlet 18, the charging cable 19 extending from the electric vehicle 12 is coupled to the outlet 25 at the time of the malfunction diagnosis control.

In the above description, in the diagnosing of malfunction including steps S18 to S23, both the in-vehicle charger 16 and the V2L inverter 23 are operated, but the present invention is not limited thereto. For instance, in the diagnosing of malfunction, both the in-vehicle charger 16 and the V2L inverter 23 may be stopped or one of the in-vehicle charger 16 and the V2L inverter 23 may be operated as long as the malfunction of the power supply path 50 can be diagnosed. In the diagnosing of malfunction, the relays R1 and R2 are closed and the relay R3 is opened, but the present invention is not limited thereto. For instance, in the diagnosing of malfunction, the relay R1 may be opened, the relay R2 may be opened, and the relay R3 may be closed as long as the malfunction of the power supply path 50 can be diagnosed.

The invention claimed is:

1. A vehicle power supply device including a power storage device, the vehicle power supply device comprising:
   an inlet that is coupled to an external power supply via a charging cable when the power storage device is charged using the external power supply;
   an outlet that is coupled to an external device when power is supplied from the power storage device to the external device;
   a first power converter that is disposed between the inlet and the power storage device and converts alternating current (AC) power into direct current (DC) power;
   a second power converter that is disposed between the outlet and the power storage device and converts DC power into AC power; and
   a controller that determines malfunction of a power supply path of the vehicle power supply device using an input to the first power converter in a state in which the inlet and the outlet are coupled to each other using the charging cable.

2. The vehicle power supply device according to claim 1, wherein the controller instructs an operator to perform an operation of coupling the inlet and the outlet using the charging cable.

3. The vehicle power supply device according to claim 2, wherein:
   the controller determines charging abnormality using an input state of AC power to the first power converter, and
   the controller instructs the operator to perform the operation of coupling the inlet and the outlet using the charging cable after the charging abnormality is determined.

4. The vehicle power supply device according to claim 1, wherein the controller causes the second power converter to operate to determine malfunction of the power supply path.

5. The vehicle power supply device according to claim 1, wherein the controller causes the first power converter and the second power converter to operate to determine malfunction of the power supply path.

6. The vehicle power supply device according to claim 1, further comprising:
   a first power supply path that couples the inlet to the first power converter; and
   a second power supply path that couples the outlet to the second power converter,
   wherein the controller determines malfunction of the power supply path the power supply path comprising the first power supply path, the charging cable, and the second power supply path.

7. The vehicle power supply devices according to claim 1, wherein the power storage device includes storage capacitors that are coupled to each other in parallel and a switch that is switchable to a disconnected state in which the storage capacitors are electrically disconnected from each other, and
   when the switch is switched to the disconnected state, at least one of the storage capacitors that is coupled to the first power converter and at least one of the storage capacitors that is coupled to the second power converter are separated.

8. The vehicle power supply device according to claim 7, wherein the controller switches the switch to the disconnected state at the time of determining the malfunction of the power supply path.

9. A malfunction diagnosis method of a vehicle power supply device including a power storage device in a vehicle, the malfunction diagnosis method comprising:
   coupling an inlet that is coupled to an external power supply via a charging cable when the power storage device is charged using the external power supply, to an outlet that is coupled to an external device when power is supplied from the power storage device to the external device, a first power converter that is disposed between the inlet and the power storage device converting alternating current (AC) power into direct current (DC) power, and a second power converter that is disposed between the outlet and the power storage device converting DC power into AC power, and
   determining, by a controller on-board the vehicle, malfunction of a power supply path of the vehicle power supply device using an input to the first power converter in a state in which the inlet and the outlet are coupled to each other using the charging cable.

10. The malfunction diagnosis method of the vehicle power supply device according to claim 9, further comprising:
instructing an operator to perform an operation of coupling the inlet and the outlet using the charging cable.

11. The malfunction diagnosis method of the vehicle power supply device according to claim 10, further comprising detecting charging abnormality on the basis of an input state of AC power to the first power converter,
wherein the operator is instructed to perform the operation of coupling the inlet and the outlet using the charging cable in the operation instructing step after the charging abnormality is detected in the detecting of charging abnormality.

12. The malfunction diagnosis method of the vehicle power supply device according to claim 9, wherein the second power converter is caused to operate in the determining of malfunction.

13. The malfunction diagnosis method of the vehicle power supply device according to claim 9, wherein the first power converter and the second power converter are caused to operate in the determining of malfunction.

14. The malfunction diagnosis method of the vehicle power supply device according to claim 9,
wherein the vehicle power supply device further includes:
a first power supply path that couples the inlet to the first power converter; and
a second power supply path that couples the outlet to the second power converter,
wherein malfunction of the power supply path including the first power supply path, the charging cable, and the second power supply path is determined in the determining of malfunction.

15. The malfunction diagnosis method of the vehicle power supply device according to claim 9, wherein the vehicle power supply device comprises an external charging system including the inlet and the first power converter, and the controller controls operating states of the external charging system.

16. The malfunction diagnosis method of the vehicle power supply device according to claim 15, wherein the external charging system comprises a plurality of sensors which are formed on the power supply path between the inlet and the first power converter, and which are coupled to the controller.

17. The malfunction diagnosis method of the vehicle power supply device according to claim 9, wherein the controller comprises a microcomputer.

18. A vehicle power supply device including a power storage device, the vehicle power supply device comprising:
an inlet that is coupled to an external power supply via a charging cable when the power storage device is charged using the external power supply;
an outlet that is coupled to an external device when power is supplied from the power storage device to the external device;
a first power converter that is formed between the inlet and the power storage device and converts alternating current (AC) power into direct current (DC) power;
a second power converter that is formed between the outlet and the power storage device and converts DC power into AC power; and
a controller that determines malfunction of a power supply path of the vehicle power supply device using an input to the first power converter in a state in which the inlet and the outlet are coupled to each other using the charging cable.

\* \* \* \* \*